US007489831B2

(12) United States Patent
Lee et al.

(10) Patent No.: US 7,489,831 B2
(45) Date of Patent: Feb. 10, 2009

(54) METHOD AND APPARATUS FOR DARKER REGION DETAILS USING IMAGE GLOBAL INFORMATION

(75) Inventors: Sangkeun Lee, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 627 days.

(21) Appl. No.: 11/056,204

(22) Filed: Feb. 11, 2005

(65) Prior Publication Data

US 2006/0182360 A1 Aug. 17, 2006

(51) Int. Cl.
*G06K 9/40* (2006.01)

(52) U.S. Cl. ........................ 382/274; 382/260; 382/275

(58) Field of Classification Search ................. 382/254, 382/260, 274–275
See application file for complete search history.

(56) References Cited

U.S. PATENT DOCUMENTS

| | | | | |
|---|---|---|---|---|
| 4,384,336 | A | 5/1983 | Frankle et al. | |
| 5,128,706 | A | 7/1992 | Shindo et al. | |
| 5,991,456 | A | 11/1999 | Rahman et al. | |
| 2003/0012448 | A1 * | 1/2003 | Kimmel et al. | 382/274 |

OTHER PUBLICATIONS

Marini and Rizzi, "A Computational Approach to Color Adaptation Effects", Image and Vision Computing 18, pp. 1005-1014, Mar. 2000.*

Marini and Rizzi, "From Retinex to Automatic Color Equalization: Issues in Developing a New Algorithm for Unsupervised Colr Equalization", Journal of Electronic Imaging 13(1), 75-84, Jan. 2004.*

Drago et al., "Design of a Tone Mapping Operator for High Dynamic Range Images Based Upon Psychophysical Evalutation and Preference Mapping", Proc. IS&T SPIE Electronic Imaging 2003. The Human Vision and Electronic Imaging VIII Conf.2003.*

Funt, B., Ciurea, F., McCann, J. "Retinex in Matlab", Journal of the Electronic Imaging, pp. 48-57, Jan. 2004.*

Brainard and Wandell, "Analysis fo the Retinex Theory of Color Vision", Journal of the Optical Society of America: Optics, Image Science, and Vision, vol. 3, Issue 10, Oct. 1986, pp. 1651-1661.*

Horn, Determining lightness from an image. Computer Graphics and Image Processing 3, 1, 277-299, 1974.*

Hurlbert, "Formal Connections Between Lightness Algorithms", Journ. Opt. Soc. Am. A/vol. 3, No. 10 Oct. 1986\.*

(Continued)

*Primary Examiner*—Brian Q Le
*Assistant Examiner*—Nathan Bloom
(74) *Attorney, Agent, or Firm*—Kenneth L. Sherman, Esq.; Michael Zarrabian, Esq.; Myers Andras Sherman, LLP

(57) ABSTRACT

A method for processing a digital input image data indexed to represent positions on a display such that the digital data is indicative of an intensity value for each position. The intensity value for each position is adjusted to generate an enhanced value based on retinex theory by operating only on a luminance channel to essentially eliminate shading and color distortion problems.

20 Claims, 3 Drawing Sheets

10

OTHER PUBLICATIONS

Rizzi and Marini, "Unsupervised Corrections of Unknown ChromaticDominants using a Brownian-path-based Retinex Algorithm", Journ. of Elec. Imag. 12(3), 431-441, Jul. 2003.*

Z. Rahman, D. J. Jobson, and G. A. Woodell, Retinex Processing for Automatic Image Enhancement, Journal of Electronic Imaging, Jan. 2004.*

Land, "Recent advances in retinex theory and some implications for cortical computations: Color vision and the natural images" Proc. Natl. Acad. Sci. USA vol. 80, pp. 5136-5169, Aug. 1983.*

E.H. Land, *Color vision and the natural image*, Proc. Nat. Acad. Sci. 1959, pp. 115-129, vol. 45.

E. Land, J.J. McCann, *Lightness and retinex theory*, Journal of the Optical Society of America, Jan. 1971, pp. 1-11, vol. 61, No. 1.

E. Land, *The Retinex theory of color vision*, Scientific American, 1977, pp. 108-128, vol. 237.

J.J. McCann, *Lesson learned from Mondrians applied to real images and color gamuts*, Seventh Color Conference: Color Science, Systems, and Applications, Nov. 1999, pp. 1-8.

D. Jason, Z. Rahman, and G.A. Woodell, *A multiscale retinex for bridging the gap between color images and the human observation of scenes*, IEEE Trans. on Image Processing, Jul. 1997, pp. 965-976, vol. 6, No. 7.

* cited by examiner

METHOD AND APPARATUS FOR DARKER REGION DETAILS USING IMAGE GLOBAL INFORMATION

FIELD OF THE INVENTION

The present invention relates generally to image processing, and more particularly to a method and apparatus for increasing details in dark regions of an image while maintaining brightness and color constancy.

BACKGROUND OF THE INVENTION

Image processing systems are at the heart of digital image revolution. These systems process the captured digital image to enhance the clarity and details of the image using image processing algorithms. Such algorithms result in images that are substantially more accurate and detailed than previously achieved using older analog methods.

There remains, however, a substantial difference between how an image is perceived by a person and an image captured and reproduced on a display medium. Despite the improvements gained by conventional digital image processing systems, such systems are still deficient in reproducing an image with the same level of detail, color constancy, and lightness of an actual scene as the eye, brain, and nervous system of a human being. This is due in part because the human nervous system has a greater dynamic range compression than is available on current digital systems. Dynamic range compression refers to the ability to distinguish varying levels of light.

The human eye has a dynamic range compression of approximately 1000:1, which means that the human eye can distinguish approximately 1000 levels of light variations. By way of contrast, digital image systems typically use only eight bits per pixel which allows for a dynamic range compression of only 255:1. As a result, a digital image reproduced as a photograph would have far less detail in the darker and brighter regions of the photograph as compared to the actual scene perceived by a viewer.

Many techniques have been developed to compensate for this lighting deficiency. These techniques can be separated into two broad categories: (1) power law or nonlinear techniques ("non-linear transforms"); and (2) retinex techniques. Each have their respective limitations however.

Non-linear techniques use a non-linear relationship to expand one portion of the dynamic range while compressing another. These techniques generally enhance details in the darker regions at the expense of detail in the brighter regions. For example, each pixel of a digital image is represented using eight bits, and is assigned a luminance value somewhere in the range of 0 to 255, with 0 representing the lowest light level and 255 the highest. If a region comprises pixels having low light values, detail is lost because there is very little gradient between the light values for each pixel. For example, it is difficult for a viewer to look at an image and distinguish between a pixel having a luminance value of 23 and a pixel having a luminance value of 25.

To solve this problem, conventional image processing systems utilize non-linear techniques to increase the luminance values for neighboring pixels, thereby creating a greater degree of contrast between the pixels. Thus, the pixel having the luminance value of 25 might be assigned a higher value such as 28 to create a greater contrast between it and the pixel having a value of 23. However, one problem associated with these non-linear systems is that they provide greater distinctions between pixels regardless of what lightness value a pixel may have been originally assigned. This results in the brighter areas which already have a "washedout" appearance to become even more washed-out. Although these techniques result in better details in the darker regions, they do so at the expense of the brighter areas of the digital image. Further, these methods cannot handle contours and abrupt boundaries well.

Retinex techniques variations increase or decrease the luminance value for a pixel based on the luminance values of surrounding pixels. These techniques are particularly useful for enhancing boundaries between lighter and darker regions of an image. However, such techniques are unsatisfactory for a number of reasons. In one technique, a large uniform zones in the image are grayed out (i.e., shading effect). In another technique a shift in color occurs in some images (i.e., color distortion) and is computationally intensive.

SUMMARY OF THE INVENTION

The present addresses the above shortcomings. It is an object of the present invention to provide a method of improving a digital image so that the image appears similar to what is perceived by human vision in all kinds and levels of lighting across the entire scene. As such, in one embodiment the present invention provides a method and apparatus for processing an image wherein an intensity value is selected and compared with a set of values and updated by a set of values (i.e., a "path"), globally distributed over an entire image.

In another embodiment, the present invention provides an example image processing method based on retinex theory, with at least the following differences compared with the conventional retinex-based algorithms: 1) the example method operates only on a luminance channel while the conventional methods operate on three different color channel (this operation can also reduce computational complexity); and 2) the example method reduces and essentially eliminates shading and color distortion problems.

Other embodiments, features and advantages of the present invention will be apparent from the following specification taken in conjunction with the following drawings.

DETAILED DESCRIPTION OF THE INVENTION

A example method and apparatus of improving details in a digital image according to an embodiment of the present invention is described. Accordingly, details for a digital image are enhanced while brightness and color constancy are preserved. At a given point (e.g., pixel) in the image, a determination is made as to whether the pixel "path elements" constituting a path are brighter or darker than the point. The output of the given point is adjusted to generate an enhanced value from averaging the outputs of path-computations selected against the given point.

Figure 1:
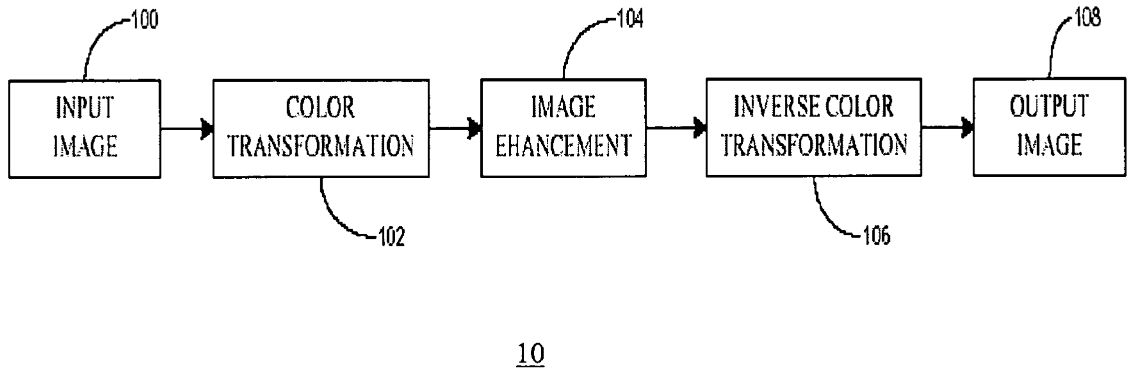
FIG. 1 shows a functional block diagram of an embodiment of an image processing according to the present invention.

FIG. 1 shows a block diagram of an image processing system 10 according to an embodiment of the present invention. An image is captured and digitized in block 100 according to well-known techniques, wherein the digitized image is represented by discrete areas referred to as pixels. In one example, the digitized image comprises three color channels, which are Red, Green, and Blue channels (also known as RGB). The color channels may be transformed into other color spaces such as CIE and YUV (Y represents luminance, U a first color difference, and V a second color difference).

According to the embodiment of the present invention described herein, the digitized image is transformed to YUV space in a transformation block 102. Each pixel is assigned a Y UV value. The Y value controls the brightness for that particular pixel. Conventional systems typically utilize eight bits to represent the Y value due to bandwidth efficiency and memory design considerations. Therefore, conventional image processing systems assign each pixel a Y value somewhere in the range of 0 to 255, with 0 representing the darkest luminance and 255 representing the brightest luminance.

Then, in an image enhancement block 104, image enhancement techniques are used to emphasize and sharpen image features for display. Such enhancement techniques operate in the spatial domain by manipulating the pixel data, or operate in the frequency domain by modifying the spectral components. The example enhancement technique according to the present invention, operates in the spatial domain, and more particularly, applies a transform only on the luminance value Y.

The example technique essentially enhances the details in the darker regions of the digitally recorded images without washing out the details at the brighter ends, thereby making the digitally recorded images more realistic with respect to an actual viewer. The example technique further reduces graying out of large uniform zones of color as occurs using conventional techniques. The example technique also reduces color shift as it operates only on the Y channel. In addition, the example technique is computationally efficient and fast as it operates only on the Y channel.

An inverse color transformation block 106 then transforms the enhanced image from YUV color channels back to RGB color channels using a rotation matrix. The enhanced RGB image is then output by block 108.

Figure 2:
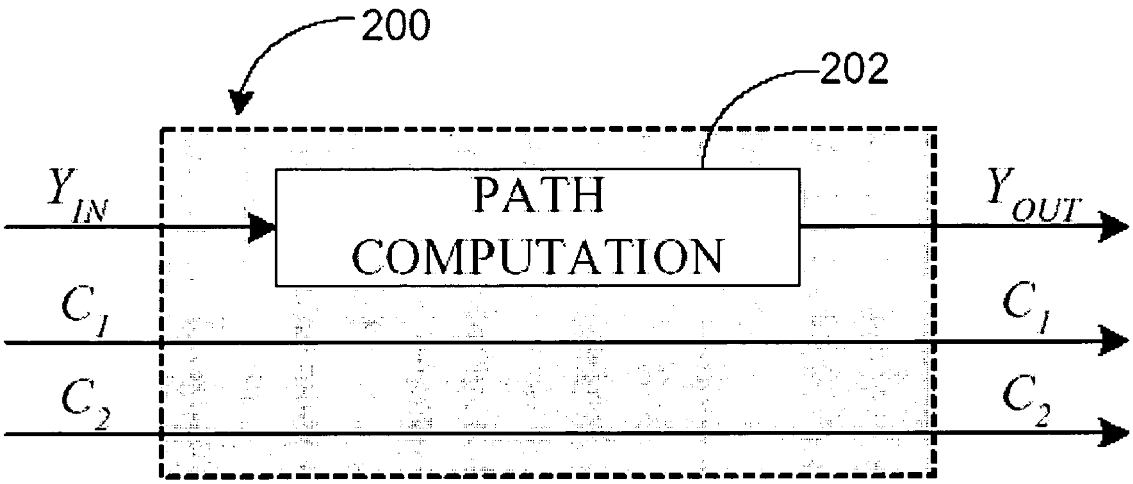
FIG. 2 shows a functional block diagram of an embodiment of an image enhancer according to the present invention.
Figure 3:
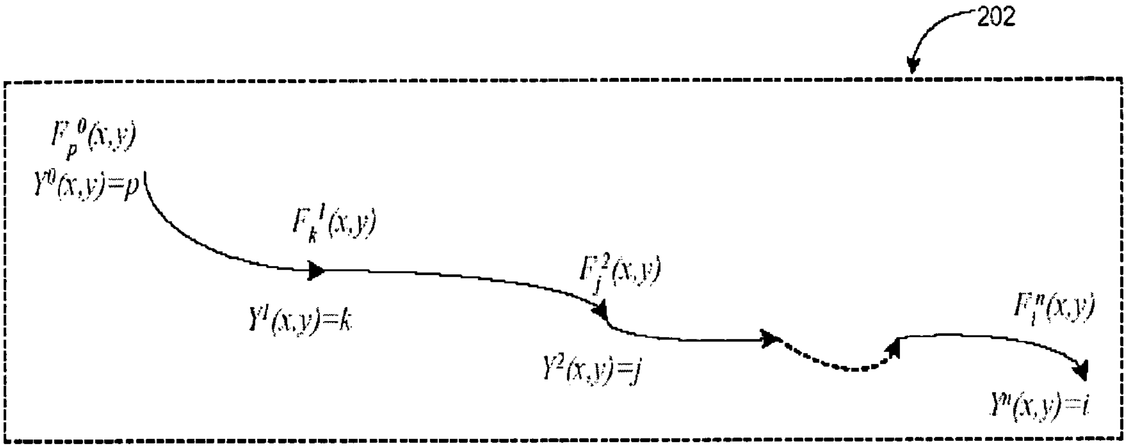
FIG. 3 shows example computation steps performed by an image enhancer according to an embodiment of the present invention.

FIG. 2 is a block diagram of an image enhancer 200 in accordance with an embodiment of the present invention, comprising a path computation block 202, wherein two color difference components (C1 and C2) pass through the enhancer 200. FIG. 3 shows the details of an embodiment of the path computation block 202, illustrating a path in the enhancer 200 to be calculated. According to the present invention, select paths and their computations is not required. However, to simplify understanding of the present invention, an example is presented. It is preferred that the number of elements in a path ("path length"), be as many as possible. Further, a number of paths may be selected and averaged after computing same measures for each path to obtain a updated value for a pixel value.

One example path computation is presented because same computation is applied to the rest of paths if another path exists. Most image enhancement algorithms usually perform on Log-scaled space for computation efficiency and more dynamic range compression issue. However, for explanatory convenience, all descriptions here initially utilize conventional decimal space.

Referring to the example in FIG. 3, starting at a random pixel denoted as $Y^0(x, y)$ and following a random path (a sequence of pixels) to an end position $Y^n(x, y)$, along the way a sequence of pixels denoted as $Y^1(x, y)$, $Y^2(x, y)$, . . . , are visited. An intermediate output $F_p^{\,n}(x, y)$ is defined at the $n^{th}$ element in the path. It is worth noting that each alphabet symbol, p, corresponding to intensity value $Y^n(x, y)$ at $n^{th}$ element is not intensity value but element position of a path in xy image plane. The example path computation is as follows.

1. Assign an initial value to $F_p^{\,0}(x, y)$ as:

$$F_p^0(x, y) = \begin{cases} \max\{Y\} - Y(x, y) & \text{if } \max\{Y\} \geq \alpha \cdot Y(x, y) \\ Y(x, y) & o.w. \end{cases}$$

where o.w indicates "otherwise", max {X} is the maximum value of a matrix X and Y(x, y) is an original reference value. Further, α is an initial control gain that adjusts the target dark region of the input image. The initial control gain can be any number greater or equal to 0. The initial values $F_p^{\,0}(x, y)$ are, for example, inversely manipulated into max {X}−Y(x, y) if α is less or equal to 1 while the initial values are more similar to the original reference values as α gets larger. As noted, in one aspect the present invention is focused on the dark area of an input image. This kind of initialization can limit the processing to the dark area of an input image while bright area stays as is. As an example, a control gain value of 2 can be used.

2. Starting with a two element path whose elements are p and k, the last element in k is as shown in FIG. 3. An intermediate output at the last element k is defined as:

$$F_k^1(x, y) = \frac{Y^1(x, y)}{Y^0(x, y)} \times F_p^0(x, y),$$

and an output at the last element k is calculated as:

$$O_k^{\,1}(x, y) = \beta \cdot f_k^{\,1}(x, y) + (1-\beta) \cdot F_k^{\,0}(x, y).$$

Where, β is a mixing control gain which adjusts the priority between the output of the previous position and that of the current position, and $$f_k^1(x, y) = \begin{cases} F_k^1(x, y) & \text{if } F_k^1(x, y) < F_k^0(x, y) \\ F_k^0(x, y) & o.w. \end{cases}.$$

Then, the intermediate output $F_k^{\,1}(x, y)$ is replaced with the above output $O_k^{\,1}(x, y)$. The β value varies from 0 to 1 (e.g., β=0.5). Similarly, for three element path whose elements are p, k, and j, the intermediate output at the last element $Y^2(x, y)$ is $$F_j^2(x, y) = \frac{Y^2(x, y)}{Y^1(x, y)} \times F_k^1(x, y),$$

and its output is $$O_j^2(x, y) = \beta \cdot f_j^2(x, y) + (1-\beta) \cdot F_j^1(x, y),$$

and $$f_j^2(x, y) = \begin{cases} F_j^2(x, y) & \text{if } F_j^2(x, y) < F_j^1(x, y) \\ F_j^0(x, y) & o.w. \end{cases}.$$

Where, $F_j^{\,1}(x, y)$ is the output which has been updated at position j when the first element k has been processed. It is assumed that the intermediate value $F_j^1(x, y)$ has been computed as well when the value $F_k^1$ was updated. The output $F_j^2(x, y)$ is replaced with $O_j^2(x, y)$ as well. Finally, for an n element path, the output at the $n^{th}$ element i can be calculated using same computations as above, where:

$$O_i^n(x, y) = \begin{cases} \beta \cdot F_i^n(x, y) + (1-\beta) \cdot F_i^{n-1}(x, y) & \text{if } F_i^n(x, y) < F_i^{n-1}(x, y), \\ \beta \cdot F_i^0(x, y) + (1-\beta) \cdot F_i^{n-1}(x, y) & o.w. \end{cases}$$

The above equation can be represented as:

$$O_i^n(x, y) = \begin{cases} \beta \cdot F_i^n(x, y) + (1-\beta) \cdot O_i^{n-1}(x, y) & \text{if } F_i^n(x, y) < O_i^{n-1}(x, y), \\ \beta \cdot F_i^0(x, y) + (1-\beta) \cdot O_i^{n-1}(x, y) & o.w. \end{cases}$$

3. If iterative processing is necessary, Step 2 is repeated, even though this step is not required. In addition to the above procedure, the output of each element in a path is once more updated with:

$$O_i^{n\prime}(x, y) = [1 - Y_{HIST}\{Y^n(x, y)\}]O_i^n(x, y) + Y_{HIST}\{Y^n(x, y)\}Y^n(x, y),$$

where, $Y_{HIST}\{k\}$ is a normalized histogram value of kth bin. This step isolates boundary artifacts because the normalized histogram value, which is probability of a value, controls the processing to have a more stable value visually. The boundary artifact occurs around the boundaries between solid areas which have large different values. In summary, the intermediate values $F_i^n(x, y)$ have a history that accumulates a comparison result with path elements passing through the position i. A pixel location is affected by the pixel locations that a path goes through in an entire input image. A pixel intensity value can be updated by weighted-averaging the intermediate values in paths, with respect to global information of an input image, in which the corresponding reference input values are brighter than the current pixel reference value.

Accordingly, in the example method and apparatus for improving details in a digital image as described herein, the image is initially represented by digital data indexed to represent positions on a display. The indexed digital data is indicative of an intensity value $Y(x, y)$ for each position $(x, y)$. The intensity value for each position is adjusted to generate an enhanced value in accordance with:

$$[1 - Y_{HIST}\{Y(x, y)\}]O^n(x, y) + Y_{HIST}\{Y(x, y)\}Y(x, y),$$

where, $Y_{HIST}\{k\}$ is the kth bin value of a normalized histogram, and $O^n(x, y)$ is an accumulated value compared and weight-averaged at $n^{th}$ element by an ordered sequence in the image.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for processing an image, comprising the steps of:

providing digital input image pixels indexed to represent positions on a display, each pixel being indicative of an intensity value for each position;

transforming RGB values into a YUV space; and adjusting the Y intensity value for the selected pixel to generate an enhanced value and maintaining the U and V values, the adjusting is further based on determining whether the pixels in an ordered sequence that form a path in the image, are brighter or darker than the selected pixel, and averaging the intensities of path-computations selected against the selected pixel, said adjusted intensity value is a combined value for each pixel between the selected pixel's intensity value and an accumulated value at each pixel in the path, based on a normalized histogram of the selected pixel's intensity value, said digital input image pixels include digital data indicative of an intensity value $Y(x, y)$ for a selected pixel $(x, y)$ in a luminance channel;

the step of adjusting further includes the steps of adjusting said intensity value for a selected pixel to generate an enhanced value $Y'(x, y)$ using the function:

$$[1 - Y_{HIST}\{Y(x, y)\}]O^n(x, y) + Y_{HIST}\{Y(x, y)\}Y(x, y),$$

where $Y_{HIST}\{k\}$ is the kth bin value of a normalized histogram, and $O^n(x, y)$ is an accumulated value compared and weighted-averaged at nth element by the ordered sequence in the input image, wherein details in darker image regions are enhanced.

2. The method of claim 1, wherein said Y intensity value comprises a luminance value.

3. The method of claim 1, wherein the step of adjusting further includes the steps of defining a path as a set of pixels distributed over the input image data, such that the selected pixel's intensity value is adjusted based on comparison of intensity values using a retinex path computation scheme without selecting paths, such that the intensity value for each position is enhanced.

4. The method of claim 1, wherein said step of computing said accumulated value as:

$$O_i^n(x, y) = \begin{cases} \beta \cdot F_i^n(x, y) + (1-\beta) \cdot O_i^{n-1}(x, y) & \text{if } F_i^n(x, y) < O_i^{n-1}(x, y), \\ \beta \cdot F_i^0(x, y) + (1-\beta) \cdot O_i^{n-1}(x, y) & o.w. \end{cases}$$

where, $\beta$ is an averaging control gain, $F_i^n(x, y)$ is an intermediate value at a pixel position i at a path computation step n, $O_i^{n-1}(x, y)$ is said enhanced value at said pixel position i at the previous path computation step n−1, and $F_i^0(x, y)$ is an initial value of initial path computation step at said position i.

5. The method of claim 4 wherein said control gain $\beta$ can vary from 0 to 1.

6. The method of claim 4, further including the steps of assigning initial values as:

$$F_p^0(x,y)=\begin{cases}\max\{Y\}-Y(x,y) & \text{if } \max\{Y\}\geq\alpha\cdot Y(x,y)\\ Y(x,y) & o.w.\end{cases}$$

where max{X} is the maximum value of a matrix X and Y(x, y) is selected pixel, α is an initial control gain that adjusts the target dark region of said input image.

7. The method of claim 6, wherein the initial values $F_p^0(x, y)$ are inversely manipulated with max{X}−Y(x, y) if α is less or equal to 1.

8. The method of claim 6 wherein the initial values $F_p^0(x, y)$ are essentially the same as that of the selected pixel as α increases beyond 1.

9. The method of claim 4 wherein said intermediate value is defined as:

$$F_i^n(x,y)=\frac{Y^i(x,y)}{Y^{i-1}(x,y)}\times O_i^{n-1}(x,y)$$

such that said intermediate value is determined by comparing the current value with the previous value in said path and multiplying said output of said path computation at said position i at said computation step n−1.

10. An image processing system comprising:

an image input module that receives digital input image pixels indexed to represent positions on a display, each pixel including a luminance, a first color difference and a second color difference intensity value for each position; and an image enhancing processor module that only adjusts said luminance intensity value for the selected pixel to generate an enhanced value, wherein details in darker image regions are enhanced and the first color difference and the second color difference values are unchanged, the image enhancing processor module further determines whether the pixels in an ordered sequence that form a path in the image, are brighter or darker than the selected pixel, and averages the intensities of path-computations selected against the selected pixel, said adjusted intensity value is a combined value for each pixel between the selected pixel's intensity value and an accumulated value at teach pixel in the path, based on a normalization of the selected pixel's intensity value, said digital input image pixels include data that is indicative of an intensity value Y(x, y) for a selected pixel (x, y) in a luminance channel;

the enhancing processor module further adjusts the intensity value by adjusting said intensity value for the selected pixel to generate an enhanced value Y'(x, y) using the function:

$$[1-Y_{HIST}\{Y(x,y)\}]O^n(x,y)+Y_{HIST}\{Y(x,y)\}Y(x,y),$$

where $Y_{HIST}\{k\}$ is the kth bin value of a normalized histogram, and $O^n(x, y)$ is an accumulated value compared and weighted-averaged at nth element by the ordered sequence in the input image.

11. The system of claim 10, wherein the enhancing processor module further defines a path as a set of pixels distributed over the input image data, such that the selected pixel's intensity value is adjusted based on comparison of intensity values using a retinex path computation scheme without selecting paths, such that the intensity value for each position is enhanced.

12. The system of claim 10, wherein the enhancing processor module further determines said accumulated value as:

$$O_i^n(x,y)=\begin{cases}\beta\cdot F_i^n(x,y)+(1-\beta)\cdot O_i^{n-1}(x,y) & \text{if } F_i^n(x,y)<O_i^{n-1}(x,y),\\ \beta\cdot F_i^0(x,y)+(1-\beta)\cdot O_i^{n-1}(x,y) & o.w.\end{cases}$$

where, β is an averaging control gain, $F_i^n(x, y)$ is an intermediate value at a pixel position i at a path computation step n, $O_i^{n-1}(x, y)$ is said enhanced value at said pixel position i at the previous path computation step n−1, and $F_i^0(x, y)$ is an initial value of initial path computation step at said position i.

13. The system of claim 12, wherein said control gain β can vary from 0 to 1.

14. The system of claim 12, wherein the enhancing processor module further assigns initial values as:

$$F_p^0(x,y)=\begin{cases}\max\{Y\}-Y(x,y) & \text{if } \max\{Y\}\geq\alpha\cdot Y(x,y)\\ Y(x,y) & o.w.\end{cases}$$

where max{X} is the maximum value of a matrix X and Y(x, y) is selected pixel, α is an initial control gain that adjusts the target dark region of said input image.

15. The system, of claim 14, wherein the initial values $F_p^0(x, y)$ are inversely manipulated with max{X}−Y(x, y) if α is less or equal to 1.

16. The system of claim 14, wherein the initial values $F_p^0(x, y)$ are essentially the same as that of the selected pixel as α increases beyond 1.

17. The system of claim 12, wherein said intermediate value is defined as:

$$F_i^n(x,y)=\frac{Y^i(x,y)}{Y^{i-1}(x,y)}\times O_i^{n-1}(x,y)$$

such that said intermediate value is determined by comparing the current value with the previous value in said path and multiplying said output of said path computation at said position i at said computation step n−1.

18. A method for processing an image, comprising the steps of:

providing digital input image pixels indexed to represent positions on a display, each pixel being indicative of an intensity value for each position; and said digital input image pixels include data that is indicative of an intensity value Y(x, y) for a selected pixel (x, y) in a luminance channel; and adjusting said intensity value for a selected pixel to generate an enhanced value Y'(x, y) using the function:

$$[1-Y_{HIST}\{Y(x,y)\}]O^n(x,y)+Y_{HIST}\{Y(x,y)\}Y(x,y),$$

where $Y_{HIST}\{k\}$ is the kth bin value of a normalized histogram, and $O^n(x, y)$ is an accumulated value compared and weighted-averaged at nth element by the ordered sequence in the input image wherein details in darker image regions are enhanced.

19. An image processing system comprising:

an image input module that receives digital input image pixels indexed to represent positions on a display, each pixel being indicative of an intensity value for each position, said digital input image pixels include data that is indicative of an intensity value Y(x, y) for a selected pixel (x, y) in a luminance channel; and an image enhancing processor module that adjusts the intensity value by adjusting said intensity value for the selected pixel to generate an enhanced value Y'(x, y) using the function:

$$[1-Y_{HIST}\{Y(x, y)\}]O^{n}(x, y)+Y_{HIST}\{Y(x, y)\}Y(x, y),$$

where $Y_{HIST}\{k\}$ is the kth bin value of a normalized histogram, and $O^{n}(x, y)$ is an accumulated value compared and weighted-averaged at nth element by the ordered sequence in the input image.

20. A computer program product for processing an image comprising a computer usable medium including a computer readable program, wherein the computer readable program when executed on a computer causes the computer to:

provide digital input image pixels indexed to represent positions on a display, each pixel being indicative of an intensity value for each position; and said digital input image pixels include data that is indicative of an intensity value Y(x, y) for a selected pixel (x, y) in a luminance channel; and adjust said intensity value for a selected pixel to generate an enhanced value Y'(x, y) using the function:

$$[1-Y_{HIST}\{Y(x, y)\}]O^{n}(x, y)+Y_{HIST}\{Y(x, y)\}Y(x, y),$$

where $Y_{HIST}\{k\}$ is the kth bin value of a normalized histogram, and $O^{n}(x, y)$ is an accumulated value compared and weighted-averaged at nth element by the ordered sequence in the input image wherein details in darker image regions are enhanced.

* * * * *